United States Patent
Glauser

(10) Patent No.: US 7,450,406 B2
(45) Date of Patent: Nov. 11, 2008

(54) POWER SUPPLY ARRANGEMENT

(75) Inventor: Hans-Peter Glauser, Laupen (CH)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 11/396,628

(22) Filed: Apr. 4, 2006

(65) Prior Publication Data

US 2006/0227579 A1    Oct. 12, 2006

(30) Foreign Application Priority Data

Apr. 12, 2005  (EP) .................................. 05405288

(51) Int. Cl.
*H02M 7/48* (2007.01)
(52) U.S. Cl. .......................................... 363/71; 307/82
(58) Field of Classification Search .................... 363/65, 363/71; 307/52, 82–86
See application file for complete search history.

(56) References Cited

U.S. PATENT DOCUMENTS

| | | | | |
|---|---|---|---|---|
| 4,783,728 A * | 11/1988 | Hoffman | ...................... | 363/37 |
| 5,237,208 A | 8/1993 | Tominaga et al. | | |
| 5,446,645 A * | 8/1995 | Shirahama et al. | ............ | 363/71 |
| 5,450,309 A * | 9/1995 | Rohner | ......................... | 363/71 |
| 5,745,356 A | 4/1998 | Tassitino, Jr. et al. | | |
| 5,757,634 A * | 5/1998 | Ferens | ......................... | 363/72 |
| 5,814,904 A * | 9/1998 | Galm | ......................... | 307/130 |
| 5,920,129 A * | 7/1999 | Smith | ........................... | 307/64 |
| 6,072,707 A * | 6/2000 | Hochgraf | ..................... | 363/71 |
| 6,134,124 A * | 10/2000 | Jungreis et al. | ............... | 363/34 |
| 6,466,469 B1 * | 10/2002 | Caruthers et al. | ............. | 363/72 |
| 6,977,446 B2 * | 12/2005 | MacKay | ...................... | 307/29 |
| 7,046,491 B2 * | 5/2006 | Colette et al. | ................. | 361/23 |
| 2002/0153779 A1 | 10/2002 | Wade et al. | | |
| 2003/0227785 A1 | 12/2003 | Johnson, Jr. | | |
| 2004/0070278 A1 * | 4/2004 | Divan et al. | ................... | 307/64 |
| 2005/0012395 A1 | 1/2005 | Eckroad et al. | | |
| 2005/0036253 A1 | 2/2005 | Tian et al. | | |

\* cited by examiner

*Primary Examiner*—Akm Enayet Ullah
*Assistant Examiner*—M'Baye Diao
(74) *Attorney, Agent, or Firm*—Birch, Stewart, Kolasch & Birch, LLP

(57) ABSTRACT

A power supply arrangement (1) has a first input for connecting to a first power source, at least one second input for connecting to at least one second power source and an output for connecting to a load. The arrangement (1) comprises at least two paralleled inverter modules (11, 12, 13) supplied by said at least one second input and a static switch (30) for switching a connection from said first power source to said load. Each of said inverter modules (11, 12, 13) comprises an internal switch (11a, 12a, 13a) for switching a connection from the respective inverter module (11, 12, 13) to said load. This architecture allows for directly connecting the critical load to the inverter group (10), thereby eliminating the susceptibility for single point failures at a common static switch for all inverter modules. Redundancy of the whole system may be easily established or increased by providing additional inverter modules. The proposed architecture guarantees a fail safe maintenance procedure as there is no manual bypass needed for maintenance of the static switch.

17 Claims, 2 Drawing Sheets

POWER SUPPLY ARRANGEMENT

BACKGROUND OF THE INVENTION

1. Field of the Invention

The invention relates to a power supply arrangement having a first input for connecting to a first power source, at least one second input for connecting to at least one second power source and an output for connecting to a load, the arrangement comprising at least two paralleled inverter modules supplied by said at least one second input and a static switch for switching a connection from said first power source to said load. The invention further relates to an uninterruptible modular power supply system comprising such a power supply arrangement as well as to an inverter module for such a power supply arrangement.

2. Description of the Related Art

Uninterruptible power supplies (UPS) are widely used. They provide an interface between a standard power source (such as AC mains) and sensitive loads (computer systems, security equipment, instrumentation etc.). The uninterruptible power supply comprises an alternate power source which is usually a DC power source (e.g. rectifiers with backup batteries). Inverters are employed for generating an AC output current from the DC input current by recomposing a regulated and continuous sine-wave output. Usual inverters comprise a DC/AC-converter, a regulation system and an output filter.

Often, at least two paralleled inverters are employed for converting the DC input to the AC output utilizable by the critical load in the case of a failure of the standard power source. Providing a plurality of inverters not only allows for higher loads but a certain redundancy may be provided such that in the event an inverter module fails other units may pick up its share and guarantee for uninterrupted supply.

It is further known that the inverters are comprised in inverter modules, that may be easily replaced in the case of defects, or further modules may be easily added if the load is increased or if a higher redundancy level is desired.

In a so-called off line topology, the primary (standard) power source (e.g. AC mains) as well as the inverter group (consisting of the plurality of inverter modules) are connected to inputs of a static switch. The output of the switch is connected to the critical load to be supplied by the power supply arrangement. The static switch (or static bypass switch) is a power-electronics device that allows for ultra-fast switching by employing suitable electronic switching devices (instead of slow mechanical parts). In normal use the static switch is in a position where the load is directly connected to the primary power source (off line mode). As soon as a power failure is detected (i.e. the standard power source fails) the static switch switches to the alternate power source (on line mode). Due to the ultra-fast switching device this change of power source is possible without interruption of the power supply for the critical load.

In the context of these existing modular inverter architectures the critical load is always connected to the energy source via the static switch, in off line as well as in on line mode. Therefore, if the static switch fails the power supply for the critical load is interrupted. This susceptibility to single point failures of the static switch constitutes a major drawback or the known architecture. Such single point failures may be caused by a number of reasons such as microcontroller resets, defects of the quartz clock circuit for the microcontroller or the microcontroller itself, defects in the circuit, which may short circuit the auxiliary supply, a defect of the auxiliary supply or many other reasons. Additionally, a cooling system for the static switch is required, either based on convection cooling or employing redundant fans.

In principle, these drawbacks may be avoided by building a static switch with full redundancy. However, this leads to a major impact on the cost of the arrangement.

Furthermore, even with a switch with full redundancy there is the additional drawback that the static switch has to be replaced by using a manual bypass if maintenance procedures are to be carried out. The manual bypass switch allows for supplying the load via direct connection to the standard power source. If this replacement is not carried out correctly by the maintenance staff the power supply for the critical load will be interrupted, i.e. the reliability of the system depends on the maintenance instructions and human skills and attention. This calls for complicated and lengthy prescribed maintenance procedures in order to minimize the risk of failures. However, human errors can never be completely prevented and are therefore a permanent threat to the reliability of the known systems.

SUMMARY OF THE INVENTION

It is the object of the invention to create a power supply arrangement pertaining to the technical field initially mentioned, that is reliable and cost-effective.

According to one aspect of the invention each of said inverter modules comprises an internal switch for switching a connection from the respective inverter module to said load.

Therefore, each inverter module has an input for connecting the second power source and an output for connecting the load and comprises an inverter circuit and an internal switch for switching a connection from said input to said output.

Thereby, according to the invention the two switching devices that normally reside inside the static switch for switching the connection to the first and to the second power source, respectively, are separated into different locations. The switch connected to the first (standard) energy source remains within the static switch. The switch connected to the inverter group is moved and distributed into the inverter modules. In the static switch this switching device is not required anymore.

This architecture allows for directly connecting the critical load to the inverter system, in particular to a redundant inverter system, which is a very reliable energy source. In redundant systems at least n+1 inverter modules are provided if n modules are required for supplying the load. There is no critical element anymore between the reliable energy source and the critical load. Due to this fact, single point failures at the static switch are no longer critical events. Therefore, there is no need for a costly static switch with full redundancy. In contrast, all system relevant redundancy is integrated in the modular inverter modules. The redundancy of the whole system may be easily increased by providing an additional inverter module.

Furthermore, the proposed architecture guarantees a fail safe maintenance procedure as there is no manual bypass needed for maintenance of the static switch. However, if desired, a manual bypass for the static switch may be still employed with this proposed architecture.

The plurality of inverter modules may be supplied by a single alternate power source or there may be a plurality of alternate power sources, each of them connected to a single inverter module or to a group of modules.

Preferably, an output of each of said inverter modules is permanently connected to said output for connecting to the load. Thereby, additional elements in between the inverter group and the critical load such as further switching devices may be avoided. Via the permanent connection each of the inverter modules may always obtain information about whether the load is presently supplied by power.

The inverter modules are controlled such that the internal switch of each of the modules is open as long as the load is supplied by said first power source. As soon as a power failure is detected at the load the internal switches of the modules are closed in order to supply the load by said second (alternate) power source. The operation of a plurality of independent fast switches arranged in the inverter modules guarantees redundancy and therefore reliable operation of the power supply arrangement.

Preferably, each of said inverter modules comprises a detection circuit connected to an output of the inverter module for detecting power failures at the load. If the outputs of the modules are permanently connected to the load as mentioned above they may always detect power failures at the load and ensure that the respective module immediately switches to on line mode. If at least one redundant inverter module is provided, failure of an inverter module does not lead to failure of the system because this additional paralleled inverter module picks up the share of the failed module and ensures further operation of the arrangement. Providing detection circuits in each of the modules ensures redundancy of this crucial element of the arrangement in the same way as it is done for the inverters and the switching devices.

Alternatively, a detection circuit or several detection circuits are arranged outside the inverter modules, e.g. within the static switch, and all the modules are controlled by this circuit or these circuits, respectively. For example, if there is a large number of inverter modules they may be separated into groups where each group is connected to a separate, preferably modular, detection device. The detection circuits are connected to the output of the arrangement for connecting to the load, to the first input of the arrangement for connecting to the standard power source or directly to the power input of the load.

Advantageously, the internal switch of the inverter module is connected between the inverter circuit and the output of the inverter module. This guarantees a short reaction time and allows for a simpler architecture if the inverter module comprises a detection circuit which is as well connected to the output of the module.

Usually, the first input of the arrangement will be adapted to be connected to an AC power source (e.g. the usual 230 V 50 Hz, 120 V 60 Hz or other standard mains systems), whereas the at least one second input is adapted to be connected to a DC power source. There are a lot of possible DC power sources: They may include storage elements such as batteries, capacitors, flywheels etc. that are charged by the AC power source or by independent power generators such as solar converters or wind generators. Alternatively the DC power sources may include power generators that allow for continuous production of power such as fuel cells. If necessary, rectifiers are employed to generate a DC output current from AC power sources.

The reliability of the system may be increased by additional redundancy if a plurality of DC power sources are provided that are connected to single inverter modules or groups of inverter modules. The modularity of the arrangement allows for easy adaptation to different needs relating to reliability, stability of the output current, required maximum load and power sources available.

Together with the DC power source the power supply arrangement constitutes a modular uninterruptable power supply system of high reliability. The modular architecture ensures easy maintenance and upgrading. The power supply system usually comprises further components, e.g. for surge protection, monitoring of the device, providing error messages etc.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

DETAILED DESCRIPTION OF THE INVENTION

Figure 1A:
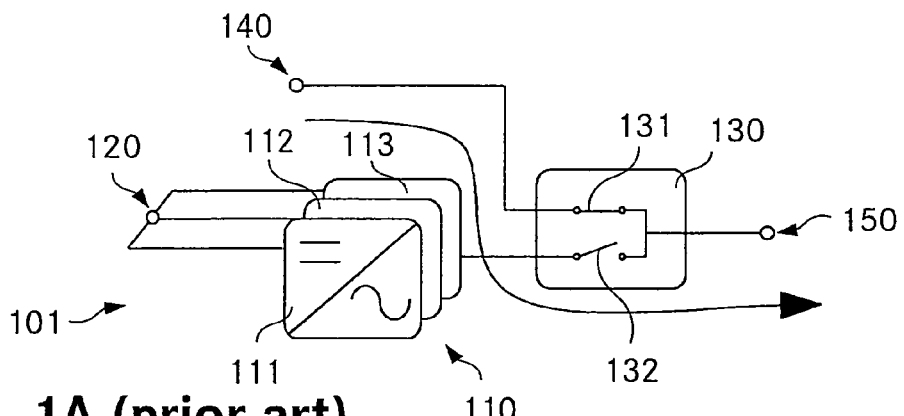
FIG. 1A, B Schematic representations of a prior art power supply arrangement in off line and on line mode, respectively.
Figure 1B:
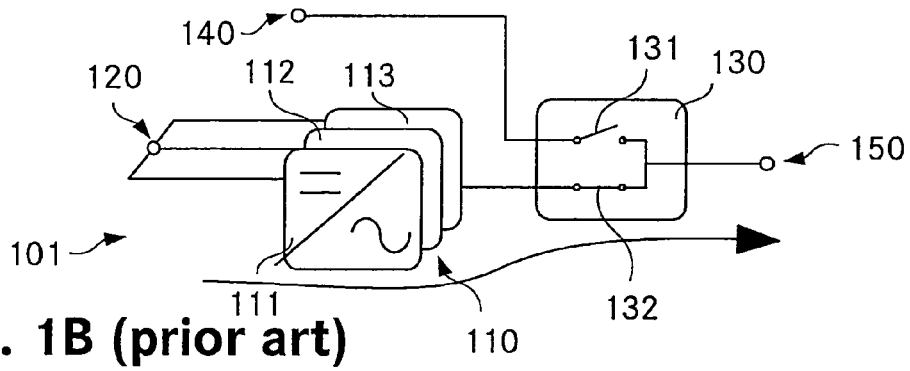

The FIGS. 1A, B are schematic representations of a prior art power supply arrangement in off line and on line mode, respectively. The arrangement 101 features an inverter group 110 comprising a plurality of inverter modules 111, 112, 113 each of them connected to an input 120 for connecting a DC power source such as a backup battery. The arrangement 101 further comprises a static switch 130 providing two switching devices 131, 132 for switching a connection from AC mains input 140 to an output 150 for connecting a critical load and a connection between the inverter modules 111, 112, 113 and the output 150, respectively.

In off line mode (FIG. 1A), power for the load output 150 is directly supplied from the AC mains input 140 through the closed first switching device 131. The inverter group 110 is not connected to the load output 150 as the other switching device 132 is open.

As soon as a power failure is detected, the static switch 130 switches, i.e. the switching device 132 closes, such that the inverter group 110 is connected to the load output 150 and the other switching device 131 opens to separate the load output 150 from the AC mains 140. Closing of the switching device 132 connected between the inverter group 110 and the load output 150 happens very rapidly such that the load output 150 is permanently supplied by power.

Because the critical load is always connected to the energy source via the static switch 130, in off line as well as in on line mode, the existing modular inverter architecture has major drawbacks related to single point failure of the static switch 130. The power supply for the critical load output 150 is interrupted if the static switch 130 fails, e.g. due to microcontroller resets or defects of the microcontroller or other circuits within the static switch 130.

Figure 2A:
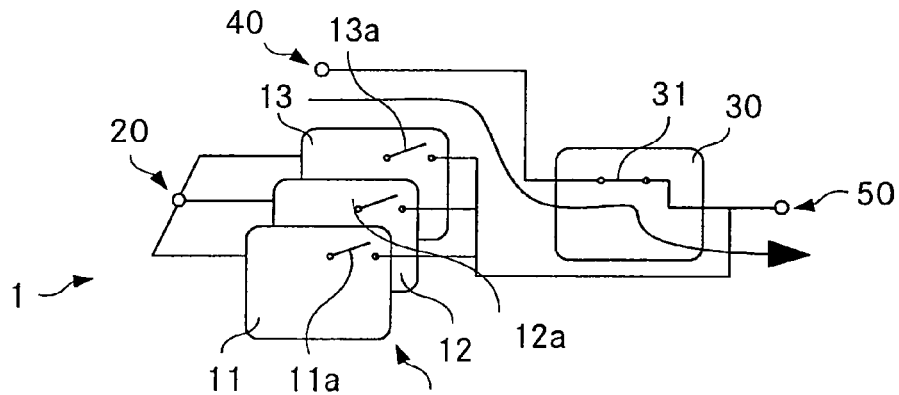
FIG. 2A, B schematic representations of a power supply arrangement according to the invention in off line and on line mode, respectively.
Figure 2B:
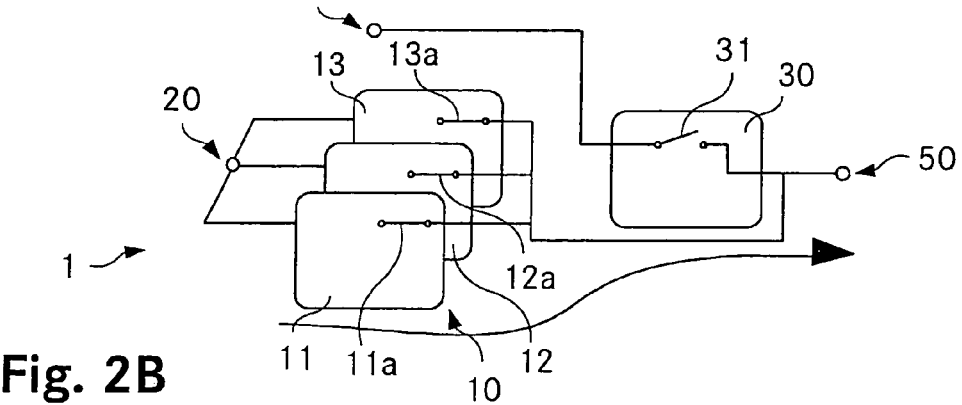

To avoid these drawbacks, a new modular inverter architecture is proposed. A corresponding power supply arrangement 1 is schematically represented in FIGS. 2A, 2B in off line and on line mode, respectively. Again, the arrangement 1 features an inverter group 10 comprising a plurality of inverter modules 11, 12, 13 each of them connected to an input 20 for a DC power source such as a backup battery. The arrangement 1 further comprises a switch module 30 providing a switching device 31 for switching a connection from an AC mains input 40 to the output 50 for connecting the critical load.

In contrast to the prior art architecture described above each of the inverter modules 11, 12, 13 features a switching device 11a, 12a, 13a in the connection from the respective inverter module to the output 50 for connecting the critical load. Thereby, the switching devices 11a, 12a, 13a integrated in the inverter modules 11, 12, 13 take over the function of the second switching device of the prior art static switch.

In off line mode (FIG. 2A), power for the load output 50 is again directly supplied from the AC mains through the closed switching device 31. There is no connection from the inverter group 10 to the load output 50 as the switching devices 11a, 12a, 13a of the inverter modules 11, 12, 13 are open.

As soon as a power failure is detected the switching devices 11a, 12a, 13a of the inverter modules close, such that the inverter group 10 is connected to the load output 50 and the other switching device 31 opens to separate the load output 50 from the AC mains input 40. Again, closing of the switching devices 11a, 12a, 13a connected between the inverters of the inverter modules 11, 12, 13 and the load 50 output happens very rapidly such that the load output 50 is permanently supplied by power.

This happens not only in cases where the AC mains power source fails but also in cases where the switch module 30 fails or is unplugged for maintenance purposes. Therefore, it is not anymore required to install a manual bypass for maintenance operations of the switch module 30.

Preferably, the number of inverter modules 11, 12, 13 is chosen such that reliable power supply for the load output 50 is ensured even if one or more of the inverter modules fail, i.e. a certain redundancy is provided. In the context of the proposed power supply architecture this scheme ensures automatically that the switching devices 11a, 12a, 13a making sure that power is supplied without interruption in case of a failure of the AC mains, are as well provided redundantly. Therefore, failure of one of these switching devices 11a, 12a, 13a does not anymore lead to a general failure of the arrangement.

Figure 3:
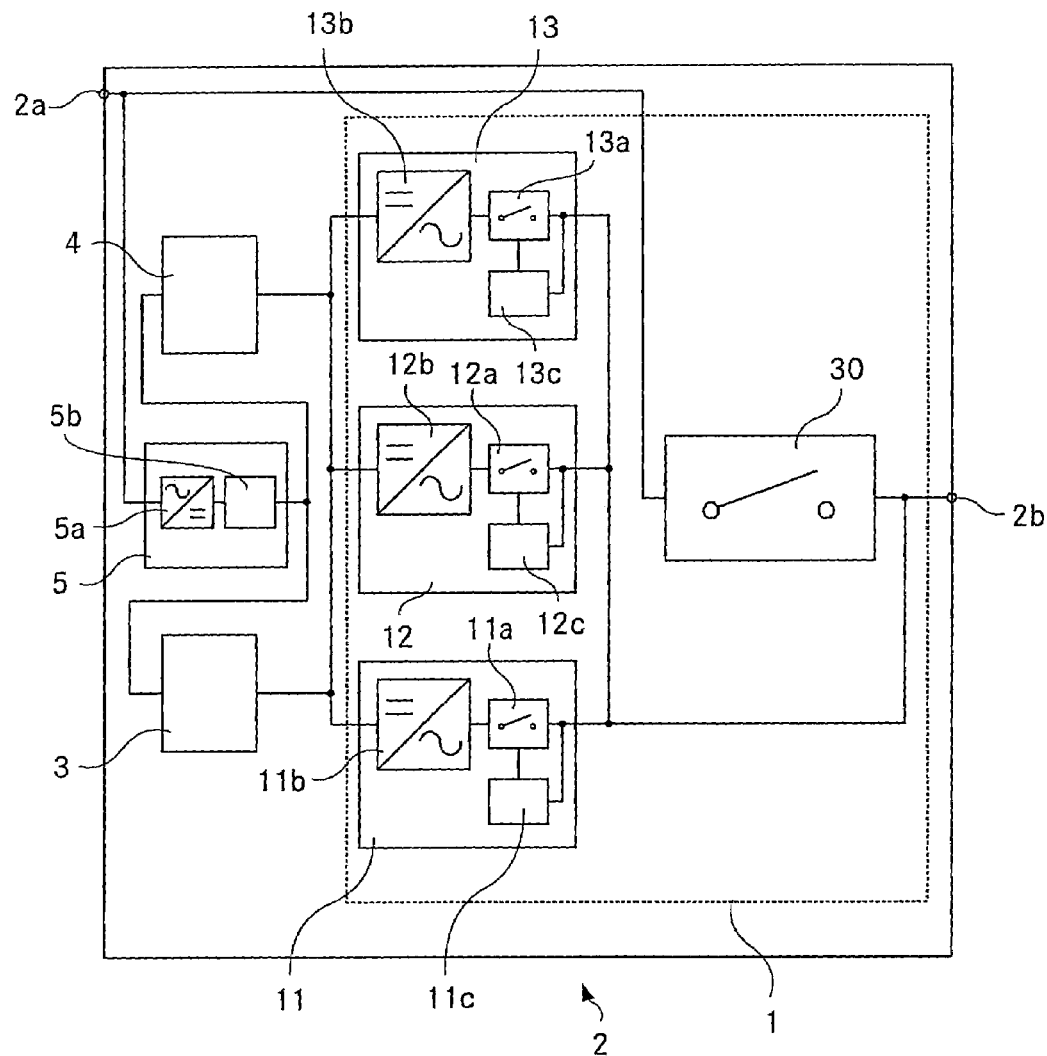
FIG. 3 a schematic representation of an uninterrupted power supply employing the power supply architecture according to the invention.

The FIG. 3 is a schematic representation of a modular uninterrupted power supply system employing the power supply architecture according to the invention. The UPS 2 comprises the power supply arrangement 1 that has been briefly discussed above in connection with FIGS. 2A, 2B. It further comprises batteries 3, 4 and a rectifier/charger module 5 that mainly consists of a rectifier 5a that is connected to the AC mains input 2a of the UPS and a charging circuit 5b that is connected between the output of the rectifier 5a and the batteries 3, 4. The rectifier/charger module 5 ensures that the batteries 3, 4 are charged when there is AC mains power such that they are ready to backup the power supply in cases of AC mains power failures.

In FIG. 3 further details of the inverter modules 11, 12, 13 are schematically displayed. Apart of the switching device 11a, 12a, 13a each of the inverter modules 11, 12, 13 features an inverter circuit 11b, 12b, 13b and a detection circuit 11c, 12c, 13c. The input of the inverter circuit 11b, 12b, 13b is connected to the batteries 3, 4; the output of the inverter circuit 11b, 12b, 13b is connected to the switching device 11a, 12a, 13a. The inverter circuit generates a sinusoidal AC output voltage with a specified frequency (such as 50 Hz or any other desired frequency) and amplitude (such as 230 V or any other desired amplitude). Such circuits are known as such and e.g. comprise a DC/AC converter circuit and an output filter (which may be passive or controlled, e.g. by a DSP). The detection circuit 11c, 12c, 13c is connected to the output of the respective inverter module 11, 12, 13 for sensing the state of the power supply of the load. This is possible because the outputs of the inverter modules 11, 12, 13 are always directly connected to the output 2b of the modular uninterrupted power supply system 2 for connecting the critical load. In off line mode, the load is supplied from the AC mains through the closed switching device 31. As soon as a power failure is detected the detection circuit 11c, 12c, 13c instructs the switching device 11a, 12a, 13a to close its switch in order to immediately supply the load with power from the batteries 3, 4.

In on line mode, the load is supplied from the batteries 3, 4. In the case of a power failure in the DC power source the switching device 31 of the static switch 30 closes and the switching devices 11a, 12a, 13a open in order to supply the load directly from the AC mains. For detecting the power failure the static switch 30 features as well two detection circuits (not displayed), one at the input to monitor the AC mains and the second at the output to monitor the load supply.

In the case of a short circuit of the load in on line mode the power supply system 2 must be able to blow the load fuse in a short time. In such a case, the detection circuits 11c, 12c, 13c in the inverter modules 11, 12, 13 detect that the output voltage is not present anymore. Based on additional internal information (e.g. a current limit condition) the inverter modules 11, 12, 13 know that this is a short circuit condition. The inverters 11, 12, 13 therefore open the switching devices 11a, 12a, 13a. The static switch 30 also detects the output voltage fail by means of its detection circuits, and turns on its switching device 31 to blow the load fuse with high current from the AC mains.

In case of an overload (to much load connected), the inverters 11, 12, 13 limit their output currents which results in a decrease of the load voltage. This is detected by the detection circuits 11c, 12c, 13c of the inverter modules 11, 12, 13. As soon as the voltage drop is outside a given threshold the inverters open their switching devices 11a, 12a, 13a. Again, also the static switch 30 will detect the output voltage error, and may thus turn on its switching device 31, to provide power from the AC mains.

The modular uninterrupted power supply system 2 further comprises a controller that has a variety of monitoring and controlling tasks, e.g. controlling the charging process, cooling equipment, regulating the function of the inverters, supervision of all internal processes, providing error messages, etc. For simplicity this controller and related devices, which as such are known from the prior art, are not shown in FIG. 3. Some of the tasks of the controller may be performed by subordinate controllers integrated into the components of the power supply system 2 such as the inverter modules 11, 12, 13, the rectifier/charger module 5 or the switch module 30.

The number of inverter modules may be freely varied depending on the required maximum power and the desired redundancy. Similarly, the number of backup power sources may be decreased to just one or increased to three or more; instead of batteries other power sources may be employed such as power capacitors etc. As mentioned above, the detection circuits for detecting failure of the standard power source may be arranged or distributed in a different way. The same is true for the arrangement of the switching devices within the inverter modules.

In a modular uninterrupted power supply system according to the invention the batteries and the rectifier/charger module may be replaced by any other kind of suitable DC power source (such as solar converters, fuel cells etc.).

In summary, it is to be noted that the invention creates a power supply arrangement that is reliable and cost-effective.

The invention claimed is:

1. A power supply arrangement, comprising:
   a first input for connecting to a first power source;
   at least one second input for connecting to at least one second power source;
   an output for connecting to a load;
   at least two paralleled inverter modules supplied by said at least one second input, each of said inverter modules comprising an internal switch for switching a connection from the respective inverter module to said load; and
   a static switch module for switching a connection from said first power source to said load,
   wherein the power supply arrangement switches from an off-line mode, in which power for the output is directly supplied from the first power source through a closed switching device of the static switch module and in which the internal switches of the inverter modules are open, to an on-line mode, by closing the internal switches of the inverter modules, such that the inverter modules are connected to the output and by opening the switching device of the static switch module to separate the output from the first input, whereby the closing of the internal switches happens very rapidly such that in case of a power failure the output is permanently supplied with power.

2. The arrangement of claim 1, wherein that an output of each of said inverter modules is permanently connected to said output for connecting to the load.

3. The arrangement of claim 2, that the inverter modules are controlled such that the internal switch of each of said inverter modules is open as long as the load is supplied by said first power source and in that the internal switch is closed as soon as a power failure is detected at the load.

4. The arrangement of claim 3, wherein each of said inverter modules comprises a detection circuit connected to an output of the inverter module for detecting the power failure at the load.

5. The arrangement of claim 1, wherein the first input is adapted to be connected to an AC power source and in that the at least one second input is adapted to be connected to a DC power source such as a battery.

6. A modular uninterruptible power supply system, comprising:
   the power supply arrangement of claim 5, and
   a DC power source connected to an input of the plurality of the paralleled inverter modules.

7. An inverter module for the power supply arrangement of claim 1, comprising:
   an input for connecting a DC power source;
   an output for connecting an AC load;
   an inverter circuit; and
   an internal switch for switching a connection from said input to said outputs,
   wherein the internal switch is closed very rapidly such that the output for connecting the AC load is permanently supplied with power.

8. The inverter module of claim 7, wherein the internal switch is connected between said inverter circuit and said output.

9. The inverter module of claim 7, further comprising:
   a detection circuit connected to said output for detecting a power failure at the load, whereby the inverter module is controlled such that the internal switch is closed as soon as the power failure is detected.

10. The arrangement of claim 2, wherein the first input is adapted to be connected to an AC power source and in that the at least one second input is adapted to be connected to a DC power source such as a battery.

11. The arrangement of claim 3, wherein the first input is adapted to be connected to an AC power source and in that the at least one second input is adapted to be connected to a DC power source) such as a battery.

12. The arrangement of claim 4, wherein the first input is adapted to be connected to an AC power source and in that the at least one second input is adapted to be connected to a DC power source such as a battery.

13. An inverter module for the power supply arrangement of claim 2, further comprising:
   an input for connecting a DC power source;
   an output for connecting an AC load;
   an inverter circuit; and
   an internal switch for switching a connection from said input to said output.

14. an inverter module for the power supply arrangement of claim 3, further comprising:
   an input for connecting a DC power source;
   an output for connecting an AC load;
   an inverter circuit; and
   an internal switch for switching a connection from said input to said output.

15. An inverter module for the power supply arrangement of claim 4, further comprising:
   an input for connecting a DC power source;
   an output for connecting an AC load;
   an inverter circuit; and
   an switch for switching a connection from said input to said output.

16. An inverter module for power supply arrangement of claim 5, further comprising:
   an input for connecting a DC power source;
   an output for connecting an AC load;
   an inverter circuit; and
   an internal switch for switching a connection from said input to said output.

17. the inverter module of claim 8, further comprising:
   a detection circuit connected to said output for detecting a power failure at the load, whereby the inverter module is controlled such that the internal switch is closed as the power failure is detected.

* * * * *

UNITED STATES PATENT AND TRADEMARK OFFICE
CERTIFICATE OF CORRECTION

PATENT NO. : 7,450,406 B2  Page 1 of 1
APPLICATION NO. : 11/396628
DATED : November 11, 2008
INVENTOR(S) : Hans-Peter Glauser It is certified that error appears in the above-identified patent and that said Letters Patent is hereby corrected as shown below:

Title Page, Assignee, Item (73):

Please change the Assignee name from "Omron Corporation" to --DET International Holding Limited--.

Signed and Sealed this

Seventh Day of July, 2009

JOHN DOLL
*Acting Director of the United States Patent and Trademark Office*